(12) United States Patent
Kobayashi

(10) Patent No.: US 8,423,719 B2
(45) Date of Patent: Apr. 16, 2013

(54) APPARATUS, PROCESSOR AND METHOD OF CONTROLLING CACHE MEMORY

(75) Inventor: Koji Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 896 days.

(21) Appl. No.: 12/230,930

(22) Filed: Sep. 8, 2008

(65) Prior Publication Data

US 2009/0106497 A1 Apr. 23, 2009

(30) Foreign Application Priority Data

Oct. 17, 2007 (JP) ................. 2007-269841

(51) Int. Cl.
- *G06F 13/00* (2006.01)
- *G06F 13/28* (2006.01)

(52) U.S. Cl.
USPC .................. 711/133; 711/128; 711/134

(58) Field of Classification Search .......... None
See application file for complete search history.

(56) References Cited

U.S. PATENT DOCUMENTS 6,681,294 B1 * 1/2004 Kato et al. ............ 711/128

FOREIGN PATENT DOCUMENTS

| JP | 10-232834 A | 9/1998 |
|----|----|----|
| JP | 2000-122968 | 4/2000 |
| JP | 2002-140234 | 5/2002 |
| JP | 2002-342163 A | 11/2002 |
| JP | 2003-517682 A | 5/2003 |
| JP | 2004-110240 | 4/2004 |

OTHER PUBLICATIONS

Chrobak, M. and Noga, J., "LRU is Better than FIFO", 1999, Algorithmica, pp. 180-185.*
Du, Y. et al., "Adaptive Energy-Aware Design of a Multi-Bank Flash-Memory Storage System", Aug. 17-19, 2005, IEEE, 11th IEEE International Conference, pp. 311-316.*
Japanese Office Action dated Sep. 7, 2012 with partial English translation thereof.
Japanese Office Action dated Nov. 16, 2012 (with English translation).

* cited by examiner

*Primary Examiner* — Kevin Verbrugge
*Assistant Examiner* — Stella Eun
(74) *Attorney, Agent, or Firm* — McGinn IP Law Group, PLLC

(57) ABSTRACT

An apparatus includes a processor which issues a plurality of commands including an identifier for classifying each of the commands, a cache memory which includes a plurality of ways to store a data corresponding to a command, wherein the cache memory includes a register to store the identifier, the register corresponding to at least one of the ways being fixed, the fixed way exclusively storing the data corresponding to the identifier during which the register stores the identifier, a replacement controller which selects a replacement way based on a predetermined replacement algorithm in case of a cache miss, and excludes the fixed way from a candidate of the replacement way when the register corresponding to the fixed way stores the identifier.

22 Claims, 20 Drawing Sheets

Fig. 1

```
DO J=1, M
 DO I=1, N
  X(I, J)=A(I, J)*B(I, J)      } LOOP A
 ENDDO
ENDDO

DO J=1, M
 DO I=1, N
  Y(I, J)=C(1, I, L, J)*A(I, J)+C(2, I, L, J)*B(I, J)+C(3, I, L, J)+C(4, I, L, J)   } LOOP B
 ENDDO
ENDDO
```

Fig. 2
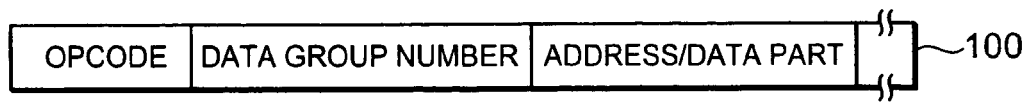
Fig. 3
| | | | |
|---|---|---|---|
| LOAD/STORE | 0000 | ADDRESS/DATA | ~101 |
| LOAD/STORE | 0000 | ADDRESS/DATA | ~102 |
| LOAD/STORE | 0001 | ADDRESS/DATA | ~103 |
| LOAD/STORE | 0001 | ADDRESS/DATA | ~104 |
| ⋮ | ⋮ | ⋮ | |
Fig. 4
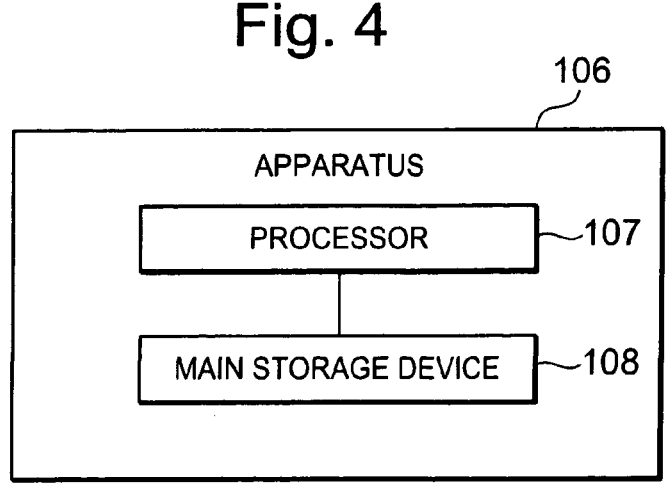

APPARATUS, PROCESSOR AND METHOD OF CONTROLLING CACHE MEMORY

INCORPORATION BY REFERENCE

This application is based upon and claims the benefit of priority from Japanese patent application No. 2007-269841, filed on Oct. 17, 2007, the disclosure of which is incorporated herein in its entirety by reference.

BACKGROUND OF THE INVENTION

1. Field of the Invention

The present invention relates to an apparatus, a processor and a method of controlling a cache memory.

2. Description of Related Art

A dynamic RAM (Dynamic Random Access Memory) usually used for a main storage device is increasing in its capacity more than ever. However, a speed of the dynamic RAM has not been increased as much as compared to an increase in speed of a processor. To make up the difference between speeds of a processor and a main storage device, a cache memory has been used. A cache memory employs a temporal/spatial locality of data and its replacement algorithm may be based on the temporal locality. The LRU (Least Recently Used) is one of the replacement algorithms based on temporal locality.

Circumstances are known in which a cache memory does not effectively work. A first example is that a processor plays-back stream data such as video data or audio data. Since stream data has low reusability and small temporal locality, a cache memory does not effectively work. A second example is that a program handles a large data set in the HPC (High Performance Computing) field, for example. When a program handles a large data set, various data stored in a cache memory is rewritten with the large data set due to the capacity limitation of the cache memory. As such, highly reusable data is replaced by the large data set, and the highly reusable data is no longer in the cache memory for the next opportunity.

FIG. 1 shows an example of a program used in the HPC field. In FIG. 1, assume that arrays A and B (e.g., A(I,J), B(I,J) in FIG. 1) constitute a data set of a capacity that may be registered in a single way of a cache memory and an array C (e.g., C(1,I,L,J) in FIG. 1) is a large data set.

In this case, after the arrays A and B are cached in a loop A, the array C being a large data set caches out most of the arrays A and B while a loop B is processed. If the cache memory may retain data in the arrays A and B, the data in the arrays A and B do not have to be transferred from a main storage device. Since data transferred from the main storage device is data in the array C (i.e., the data in the arrays A and B are already stored in the cache memory when the cache memory retains the data in the arrays A and B), the cache hit ratio improves and the processor performance improves. Additionally, the number of accesses to the main storage device decreases, thereby realizing the low power consumption.

Japanese Patent Laid-Open No. 2000-122968 (see Patent Document 1) discloses an input/output cache memory characterized by retaining data only for a particular input/output device, using a way of the input/output cache memory as a unit.

Japanese Patent Laid-Open No. 2002-140234 (see Patent Document 2) discloses a cache apparatus. The cache apparatus is placed between a processor and a main storage, and temporally registers data in the main storage by a data group unit in the main storage. The apparatus includes a cache memory, definition setting means, group determination means, registration policy designation means, reading out means, replacement decision means and registration means.

The cache memory registers control information of each retained data group in association with the data group. The definition setting means sets definition of attribution of a data group to be managed. The group determination means determines attribution of a data group to be fetched according to the definition being set from information of an instruction issued when the processor fetches a data group from the main storage. The registration policy designation means sets a registration policy defining how to register in the cache memory according to the attribution of the data group. The reading-out means determines whether or not a data group to be read from the processor has been recorded in the cache memory. In case of a miss, the reading-out means reads out the data group from the main storage. The replacement decision means decides replacement into the cache memory according to the attributes of the data group, attribution information in control information of the cache memory and the registration policy. The registration means registers a data group decided to be recorded by the replacement decision means in the cache memory, and registers the attribution as corresponding control information.

In Patent Document 2, the replacement decision means decides which way the data is to be replaced based on the registration policy. The registration policy defines a location (e.g., the way of the cache memory) of the cache memory that each of the data corresponding to each of the attribution information would be stored. In other words, the replacement decision means directly decides the location based on the registration policy. The registration policy is registered by the registration policy designation means which is configured by software or the like.

Japanese Patent Laid-Open No. 2004-110240 (see Patent Document 3) discloses a cache memory apparatus. In the cache memory apparatus, a cache memory includes a data memory region to temporally store data from a main memory based on an instruction by a processor, and a tag memory region to store an address of the temporally stored data. The cache memory includes a process information management table. The process information management table assigns an identification number and attributes including the residence priority in a cache to each process representing serial program execution and stores them as a table. The cache memory apparatus provides a field to designate an identification number of the above process correspondence in the above tag memory region. During the process execution, the apparatus uses a cache according to processing of designated attributes based on the above identification number.

[Patent Document 1] Japanese Patent Laid-Open No. 2000-122968
[Patent Document 2] Japanese Patent Laid-Open No. 2002-140234
[Patent Document 3] Japanese Patent Laid-Open No. 2004-110240

SUMMARY OF THE INVENTION

According to one exemplary aspect of the present invention, an apparatus includes a processor which issues a plurality of commands including an identifier for classifying each of the commands, a cache memory which includes a plurality of ways to store a data corresponding to a command, wherein the cache memory includes a register to store the identifier, the register corresponding to at least one of the ways being fixed, the fixed way exclusively stores the data corresponding to the identifier during which the register stores the identifier, and a replacement controller which selects a replacement way based on a predetermined replacement algorithm in case of a cache miss, and excludes the fixed way from a candidate of the replacement way when the register corresponding to the fixed way stores the identifier.

According to another exemplary aspect of the present invention, a processor which issues a plurality of commands including an identifier for classifying each of the commands, the processor includes a cache memory which includes a plurality of ways to store a data corresponding to the command, wherein the cache memory includes a register to store the identifier, the register corresponding to at least one of the ways being fixed, the fixed way exclusively stores the data corresponding to the identifier during which the register stores the identifier, and a replacement controller which selects a replacement way based on a predetermined replacement algorithm in case of a cache miss, and excludes the fixed way from a candidate of the replacement way when the register corresponding to the fixed way stores the identifier.

According to another exemplary aspect of the present invention, a method for controlling a cache memory including a plurality of ways includes issuing a plurality of commands including an identifier for classifying each of the commands, storing a data corresponding to a command to the cache memory, storing the identifier to a register, the register corresponding to at least one of the ways being fixed, the fixed way exclusively stores the data corresponding to the identifier during which the register stores the identifier, selecting a replacement way based on a predetermined replacement algorithm in case of a cache miss, and excluding the fixed way from a candidate of the replacement way when the register corresponding to the fixed way stores the identifier.

BRIEF DESCRIPTION OF THE DRAWINGS

Other exemplary aspects and advantages of the invention will be made more apparent by the following detailed description and the accompanying drawings, wherein:

FIG. 1 is a diagram showing an example of a program used in a HPC field.

FIG. 2 is a diagram showing exemplary instruction specifications of the load instruction and the store instruction of the present invention.

FIG. 3 is a diagram illustrating an exemplary sequence of instructions in an execution file.

FIG. 4 is a block diagram of the apparatus according to a first exemplary embodiment.

DETAILED DESCRIPTION OF THE EXEMPLARY EMBODIMENT

Figure 5:
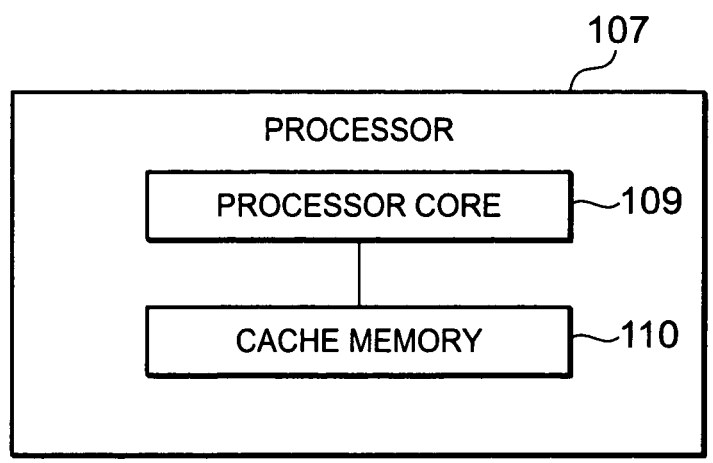
FIG. 5 is a block diagram of a processor according to the first exemplary embodiment.

According to Patent Document 1, it is explicitly indicated which way is used by a certain input/output device, so that there is a drawback in that a way number must be directly designated to fix a registration destination way.

According to Patent Document 2, the replacement decision means directly decides the location of the data based on the registration policy (i.e., the replacement decision means directly indicates a way number). The registration policy is registered by the registration policy designation means which is configured by the software or the like. Therefore, the software or the like must recognize how many ways the cache memory includes.

According to Patent Document 3, a cache is used as a process unit, so that there is a drawback in that if a single process includes both processing to handle a large data set and processing to handle a small data set, the large data set caches out the small data set.

It is an exemplary feature of the present invention to group transfer data into data groups, and fix a registration destination way that the transfer data is stored, the way may be configured as an n-way set associative cache memory.

It is another feature of the present invention to provide fixing the registration destination way without directly indicating the way number.

According to the present invention, the transfer data may be grouped into data groups, and the registration destination way may be fixed to the n-way set associative cache memory when transfer data belonging to an identical data group is registered. Additionally, the registration destination way may be fixed without directly indicating the way number.

The present invention leaves a particular data in an n-way set associative cache memory. The following will describe exemplary embodiments of a four-way set associative cache memory in detail, wherein n=4 for convenience of description. However, the present invention is not limited to the four-way set associative cache memory.

1. First Exemplary Embodiment

As instructions for a processor core to access a main storage device, a load instruction and a store instruction are provided, for example. FIG. 2 is a diagram showing instruction specifications of the load instruction and the store instruction according to a first exemplary embodiment.

As shown, instruction specifications 100 define an opcode, a data group number and an address/data part. The opcode is a field to store a code assigned to the load instruction or the store instruction. The data group number is a field to store a group number of data transferred by the load instruction or the store instruction. The address/data part is a place to save data or a field to store the data.

For the data group number, an identical number is assigned to data belonging to an identical group, and data, which are assigned the identical data group number, is cached in an identical way in a set associative cache memory. The data group number may be assigned to particular data such as when a compiler to compile a source code according to a pre-determined algorithm, detects a large data set. The number may be also assigned through description in a program source code by a programmer. The number may not be assigned if it is unnecessary.

As shown in FIG. 2, according to the first exemplary embodiment, the data group number is defined as a part of an instruction. When a processor core executes the load instruction or the store instruction containing the data group number, the data group number is indicated to the cache memory.

FIG. 3 is a diagram illustrating an exemplary sequence of instructions in an execution file. According to the instruction specifications in FIG. 2, each of instructions 101 to 104 in FIG. 3 includes an opcode of the load instruction or the store instruction, the data group number and an address or data. The data group numbers of the instructions 101 and 102 are zero (0). As such, when the processor core executes either of the instructions 101 and 102, the data group number 0 may be indicated to the cache memory. The cache memory tries to cache data transferred by the instructions 101 and 102 in an identical way. Meanwhile, the data group numbers of the instructions 103 and 104 are one (1). As such, when the processor core executes either of the instructions 103 and 104, the data group number 1 may be indicated to the cache memory. The cache memory tries to cache data transferred by the instructions 103 and 104 in an identical way.

FIG. 4 is a block diagram of an apparatus according to the first exemplary embodiment. As shown, the apparatus 106 includes a processor 107. The processor 107 reads out data from a main storage device 108 and writes data in the main storage device 108.

FIG. 5 is a block diagram of the processor 107 according to the first exemplary embodiment. As shown, the processor 107 includes a processor core 109 for executing an instruction and a cache memory 110 for temporally retaining transferred data. The cache memory 110 according to the first exemplary embodiment may be a four-way set associative memory, for example.

Figure 6:
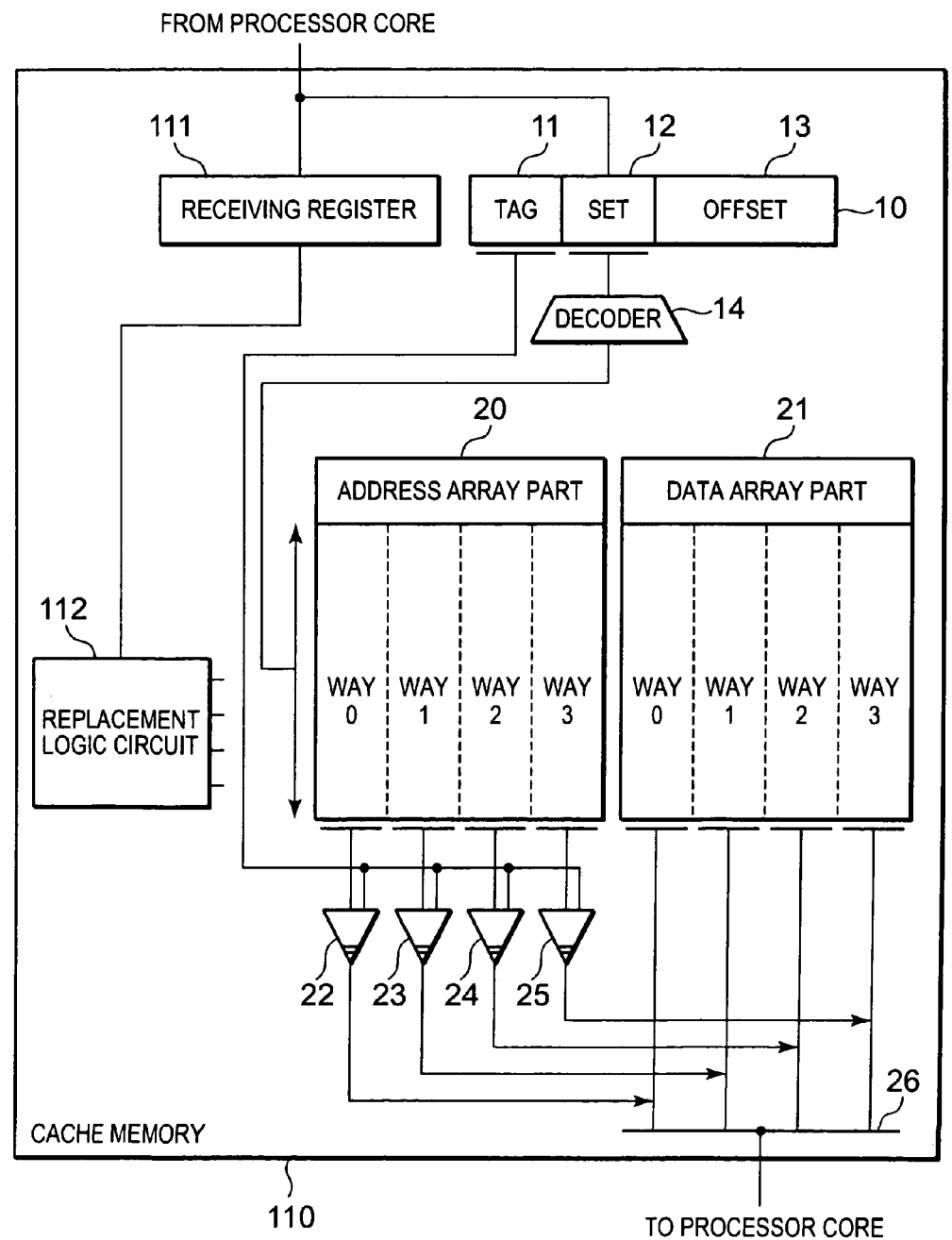
FIG. 6 is a block diagram of a cache memory.

FIG. 6 is a block diagram of the cache memory 110. In FIG. 6, the cache memory 110 includes an external memory address register 10, a decoder 14, an address array part 20, a data array part 21, comparators 22 to 25, a selector 26, a receiving register 111 and a replacement logic circuit 112. The external memory address register 10 retains an external memory address including a tag 11, a set number 12 and an offset 13. The decoder 14 decodes a set number to obtain a single set row from the address array part 20 and the data array part 21. Each of the address array part 20 and the data array part 21 includes four ways, for example. The comparators 22 to 25 compare a tag and an address of a set row. When any of the comparators 22 to 25 is ON, the selector 26 selects a way corresponding to the comparator. The receiving register 111 retains the data group number. The replacement logic circuit 112 outputs a way selection signal to select a way for data to be replaced in case of a cache miss.

Figure 7:
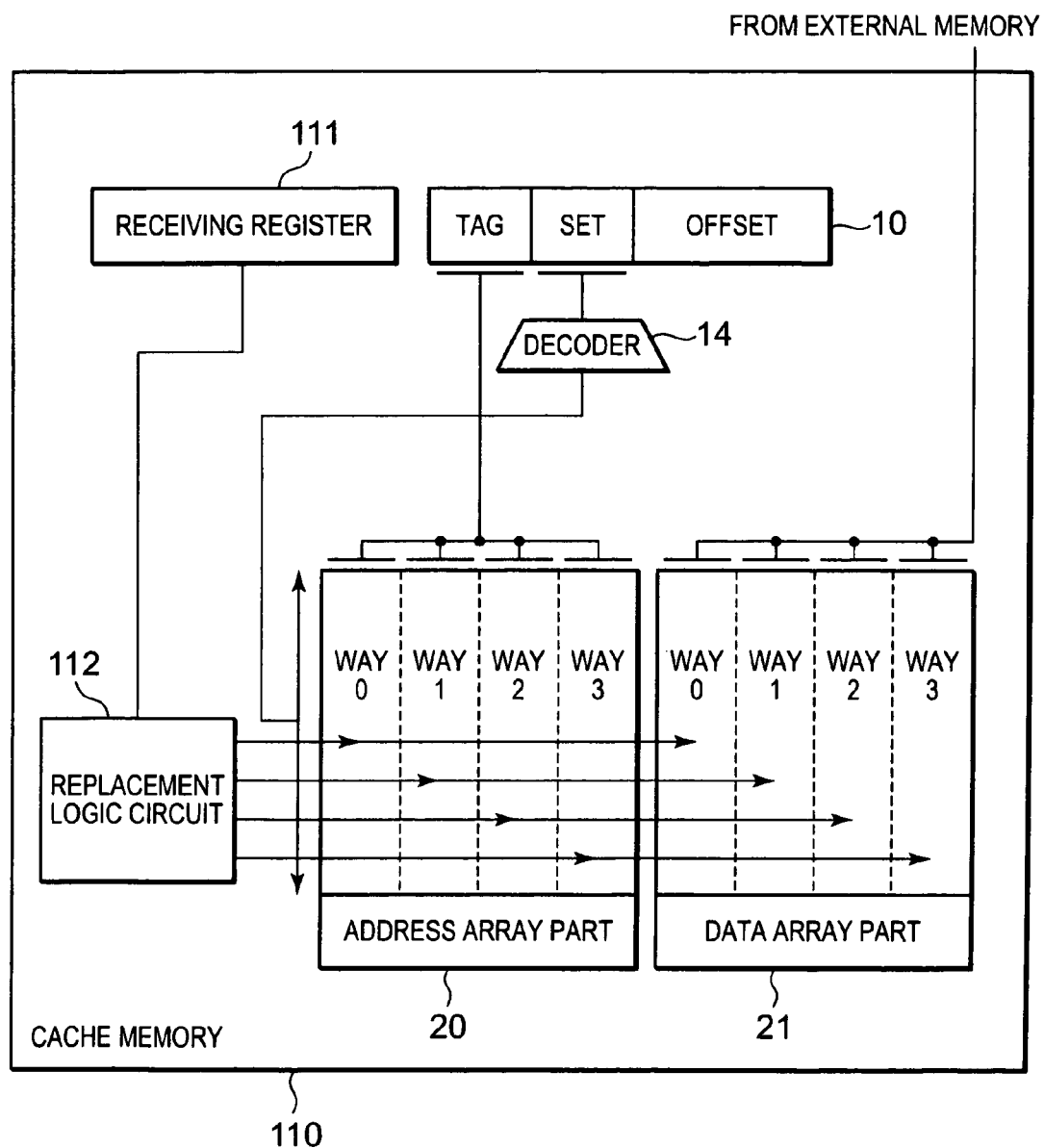
FIG. 7 is a diagram illustrating an exemplary operation of the cache memory in case of a cache miss.

FIG. 7 is a diagram illustrating an exemplary operation of the cache memory 110 in case of a cache miss. In case of a cache miss, the replacement logic circuit 112 selects the most suitable way for replacement among four ways. If the replacement logic circuit 112 selects a way 0, it outputs a way selection signal "1000", for example. Then, the way 0 of a decoded set row is replaced. The way 0 of the address array part is replaced with content of a tag, while the way 0 of the data array part 21 is replaced with data which is transferred from the main storage device 108. If the replacement logic circuit 112 selects a way 1, then it outputs the way selection signal "0100", for example. Then, the way 1 of the set row is replaced. The way 1 of the address array part 20 is replaced with content of the tag, while the way 1 of the data array part 21 is replaced with data which is transferred from the main memory device 108. If the replacement logic circuit 112 selects a way 2, then it outputs the way selection signal "0010", for example. If the replacement logic circuit 112 selects a way 3, then it outputs the way selection signal "0001", for example. Otherwise, if no replacement is performed in case of a cache miss, then the replacement logic circuit 112 outputs the way selection signal "0000", for example.

Figure 8:
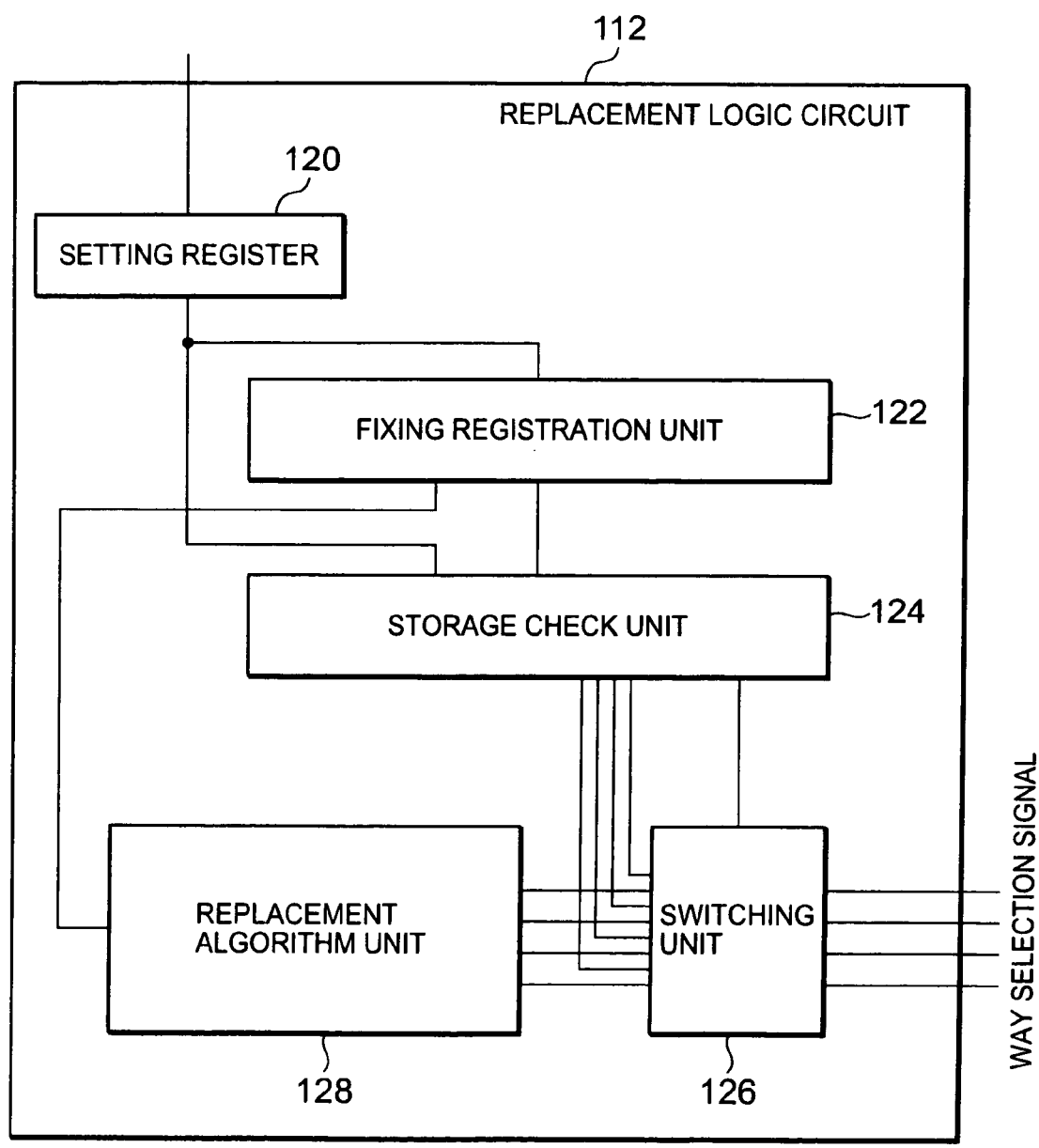
FIG. 8 is a block diagram of a replacement logic circuit.

FIG. 8 is a block diagram of a replacement logic circuit 112. In FIG. 8, the replacement logic circuit 112 includes a setting register 120, a fixing registration unit 122, a storage check unit 124, a switching unit 126 and a replacement algorithm unit 128.

The setting register 120 stores the data group number if the processor core 109 executes the load instruction or the store instruction and includes the data group number. The fixing register unit 122 includes at least one fixing register associated with at least one of the ways. In other words, each of the fixing registers 122 corresponds to at least one of the ways. The storage check unit 124 checks whether or not the data group number stored in the setting register 120 matches the data group number stored in the fixing register. The replacement algorithm unit 128 may select one way of four ways according to a pre-determined replacement algorithm. The switching unit 124 switches between output of the storage check unit 124 and output of the replacement algorithm unit 128 depending on a storage signal outputted by the storage check unit 124.

Figure 9:
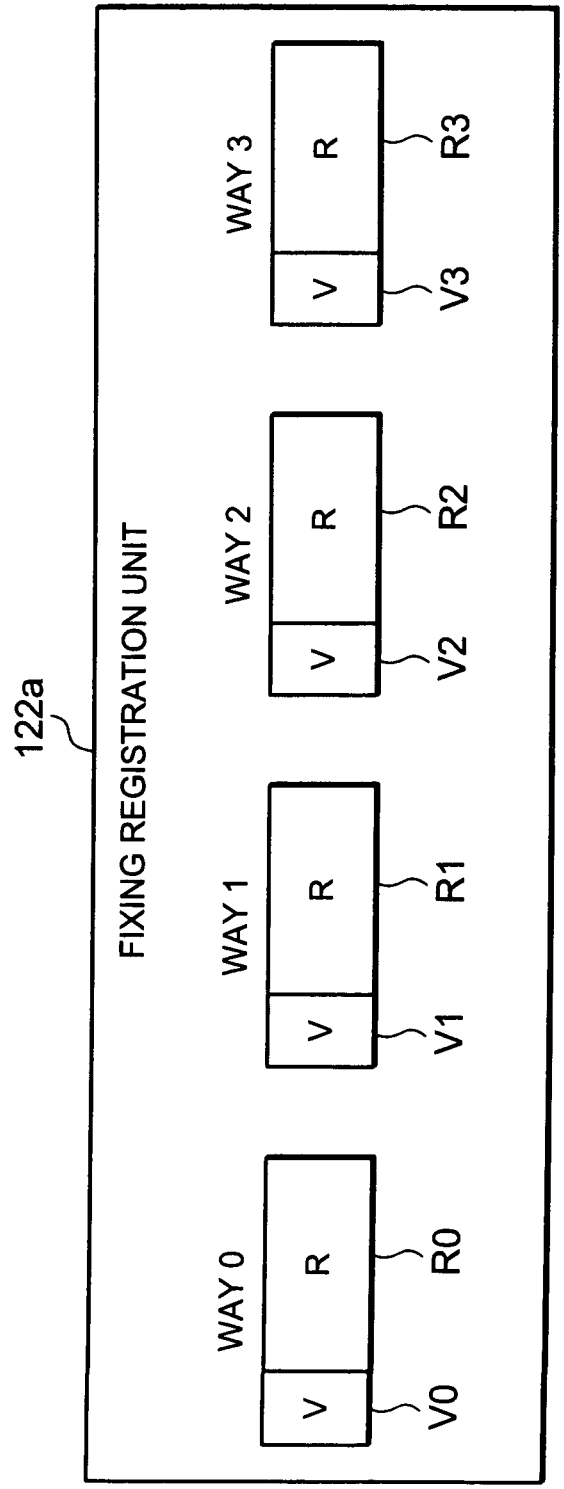
FIG. 9 is a block diagram showing an exemplary configuration of a fixing registration unit.

FIG. 9 is a block diagram showing an exemplary configuration of a fixing registration unit 122a. In FIG. 9, a fixing registration unit 122a includes four fixing registers R0 to R3. The fixing registers R0 to R3 store data group numbers. Valid memories V0 to V3 retain valid data indicating whether or not the respective corresponding fixing registers R0 to R3 store data group numbers. In this exemplary embodiment, each of the fixing registers R0 to R3 and the valid memories V0 to V3 is associated with each of the ways 0 to 3 of the cache memory, respectively. The fixing registration unit 122a may be configured to retain a single data group in a single way.

Figure 10:
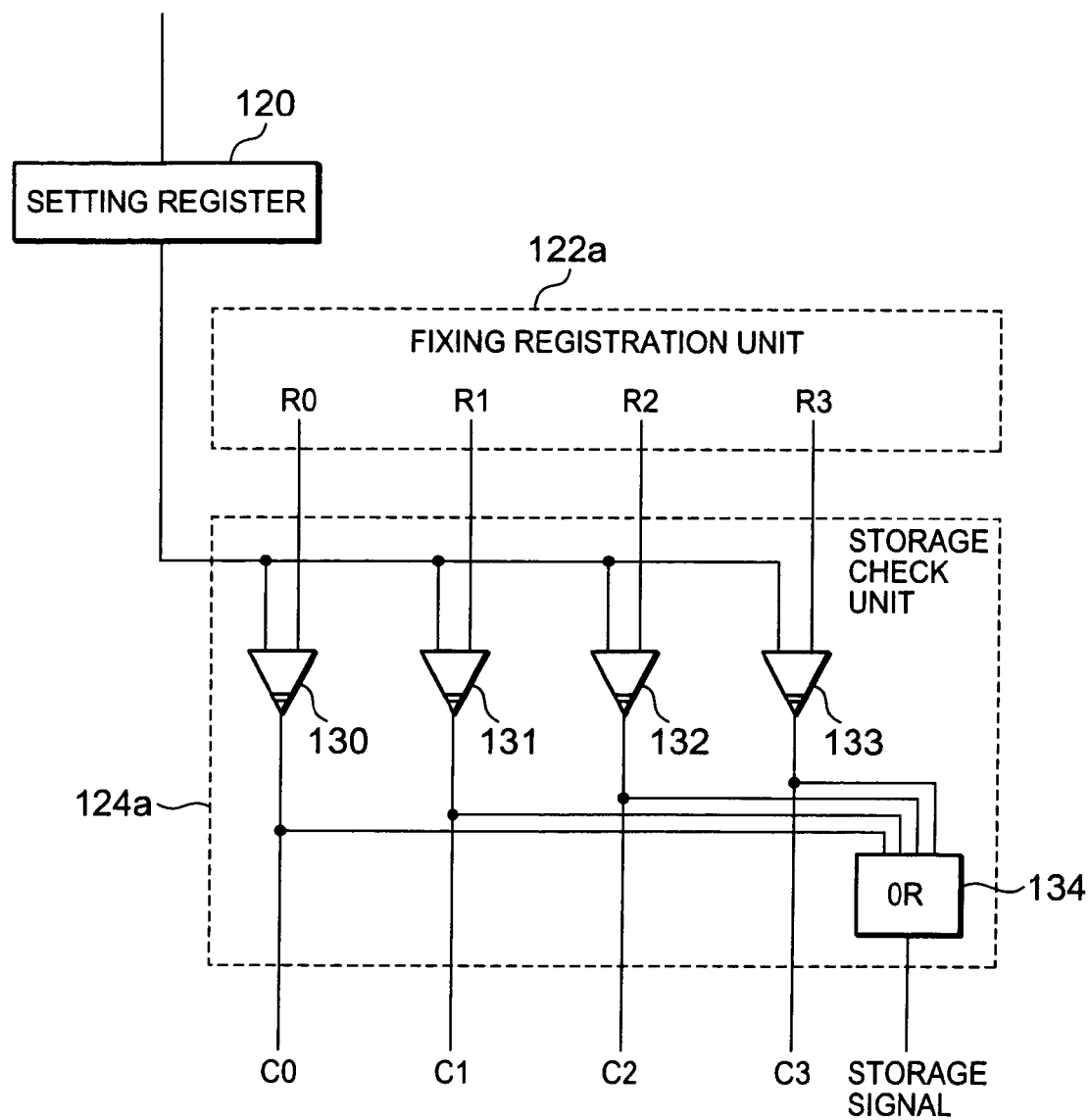
FIG. 10 is a block diagram showing an exemplary configuration of a storage check unit.

FIG. 10 is a block diagram showing an exemplary configuration of a storage check unit 124a. In FIG. 10, the storage check unit 124a includes comparators 130 to 133 and an OR circuit 134. The comparator 130 compares the data group number stored in the setting register 120 and the data group number stored in the fixing register R0. If they match each other, then the comparator 130 outputs an ON matching signal C0. The comparator 131 compares the data group number retained in the setting register 120 and the data group number stored in the fixing register R1. If they match each other, then the comparator 131 outputs an ON matching signal C1.

The comparator 132 compares the data group number retained in the setting register 120 and the data group number stored in the fixing register R2. If they match each other, then the comparator 132 outputs an ON matching signal C2. The comparator 133 compares the data group number retained in the setting register 120 and the data group number stored in the fixing register R3. If they match each other, then the comparator 133 outputs an ON matching signal C3. The OR circuit 134 outputs an ON storage signal if at least one of the matching signals C0 to C3 is ON, and outputs an OFF storage signal if all of the matching signals C0 to C3 are OFF.

Figure 11:
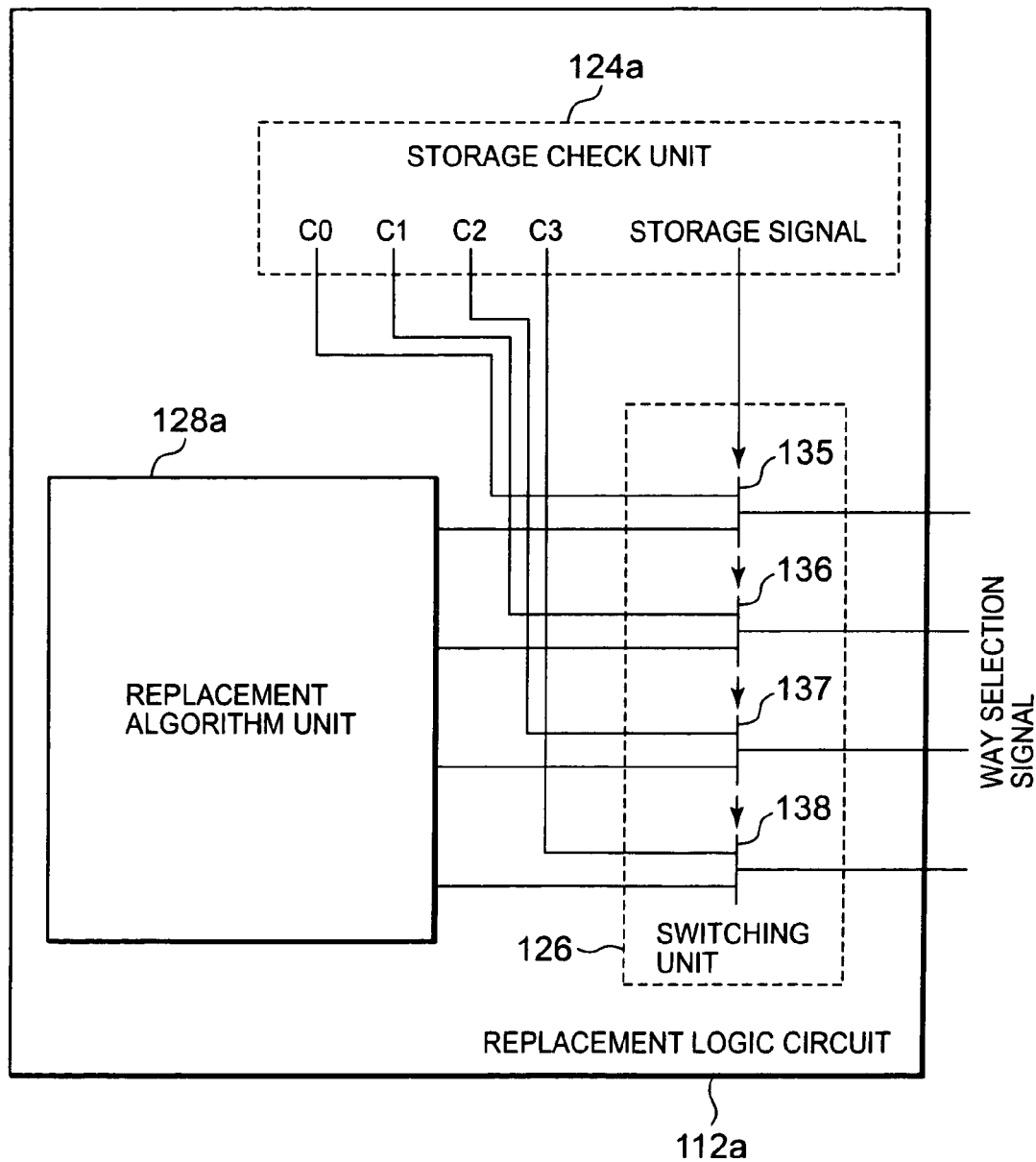
FIG. 11 is a block diagram showing an exemplary configuration of a switching unit.

FIG. 11 is a block diagram showing an exemplary configuration of the switching unit 126. In FIG. 11, the switching unit 126 uses four selectors 135 to 138 to switch between the matching signals C0 to C3 and an output from the replacement algorithm unit 128. The switching unit 126 outputs one of the matching signals C0 to C3 as the way selection signals if a stored check signal is ON. If a stored check signal is OFF, then the switching unit 126 outputs an output signal of the replacement algorithm unit 128 as the way selection signal.

Figure 12:
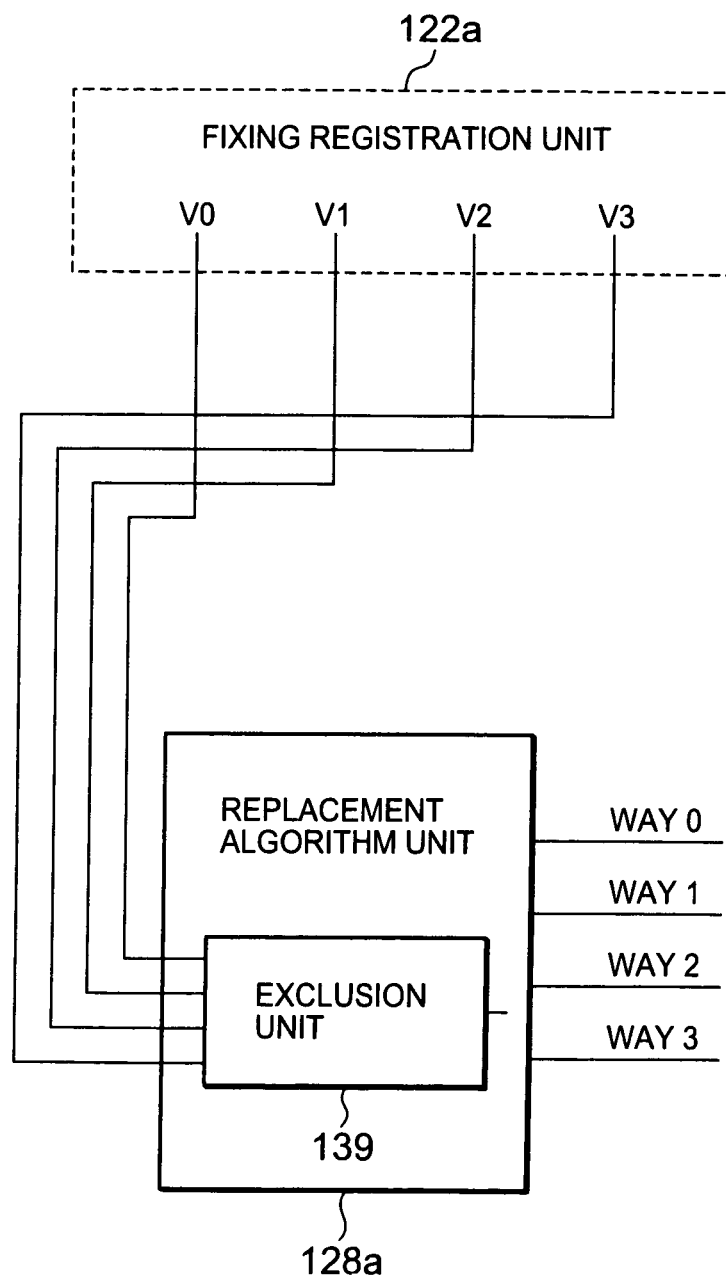
FIG. 12 is a block diagram showing an exemplary configuration of a replacement algorithm unit.

FIG. 12 is a block diagram showing an exemplary configuration of a replacement algorithm unit 128a. In FIG. 12, the replacement algorithm unit 128a includes an exclusion unit 139. The exclusion unit 139 refers to the valid memories V0 to V3, and the exclusion unit 139 excludes the way corresponding to a valid memory in which valid data is effective from candidates of a way selection.

For example, if valid data in the valid memory V0 is only effective, then the replacement algorithm unit 128a excludes the way 0 from candidates of the way selection and selects the way from the ways 1 to 3. Otherwise, if all valid data in the valid memories V0 to V3 is effective, then the replacement algorithm unit 128a excludes the ways 0 to 3 from candidates of the way selection, and does not select any of the ways.

Figure 13:
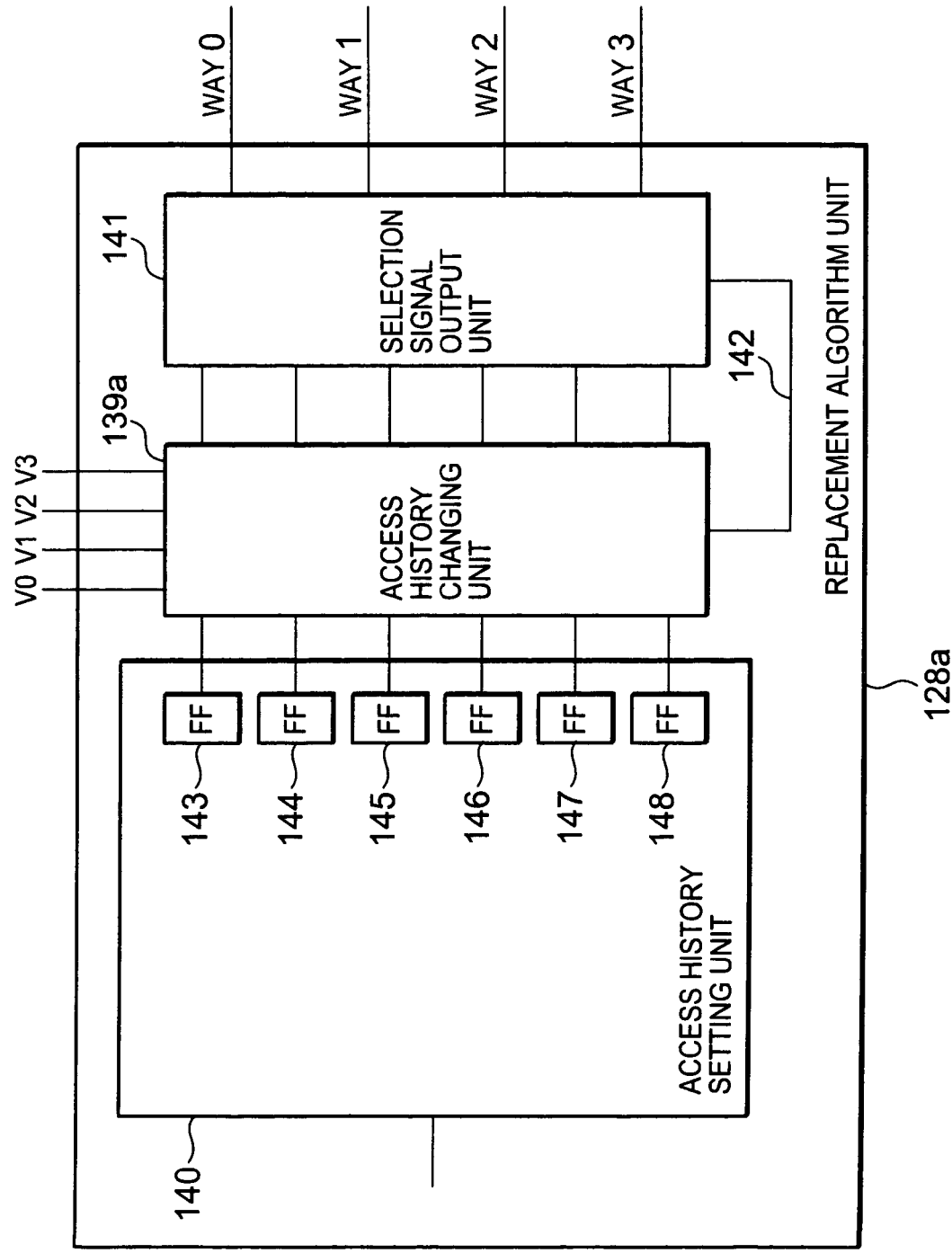
FIG. 13 is a block diagram showing an exemplary configuration of a replacement algorithm unit.

FIG. 13 is a block diagram showing an example of the replacement algorithm unit 128a. In FIG. 13, the replacement algorithm unit 128a includes an access history setting unit 140, an access history changing unit 139a, a selection signal output unit 141 and a control line 142.

The access history setting unit 140 includes six flip-flop circuits 143 to 148 being set and reset according to the LRU (Least Recently Used) algorithm. In FIG. 13, each of the flip-flops 143 to 148 stores an information regarding each of pairs of ways. The information indicates which way of the pair is least recently accessed. The least recently accessed way is assigned with the highest replacement order. The flip-flop circuit 143 is set if the way 0 is less recent than the way 1. The flip-flop circuit 144 is set if the way 0 is less recent than the way 2. The flip-flop circuit 145 is set if the way 0 is less recent than the way 3. The flip-flop circuit 146 is set if the way 1 is less recent than the way 2. The flip-flop circuit 147 is set if the way 1 is less recent than the way 3. The flip-flop circuit 148 is set if the way 2 is less recent than the way 3.

In FIG. 13, the access history changing unit 139a refers to valid data in the valid memories V0 to V3, and reverses a signal outputted from the flip-flop circuits 143 to 148 depending on the contents of the valid memories V0 to V3.

For example, when valid data in the valid memory V1 is effective, the unit 135a changes the access history to indicate that the way 1 has been most recently accessed. For example, if an output of the flip-flop circuit 143 indicates access to the way 1 is less recent than access to the way 0, the unit 135a mandatorily reverses a signal outputted from the flip-flop circuit 143, so that the signal indicates the access to the way 1 is more recent than the access to the way 0.

The selection signal output unit 141 outputs a signal to select the least recently accessed way based on six-bit data outputted from the access history changing unit 135a, for example. If all of valid data in the valid memories V0 to V3 are valid, then the control line 142 conveys a no-selection signal to notify that no way is selected from the access history changing unit 135a to the selection signal output unit 141. At this time, the selection signal output unit 141 mandatorily outputs "0000", for example, such that any of four ways is not selected.

Figure 14:
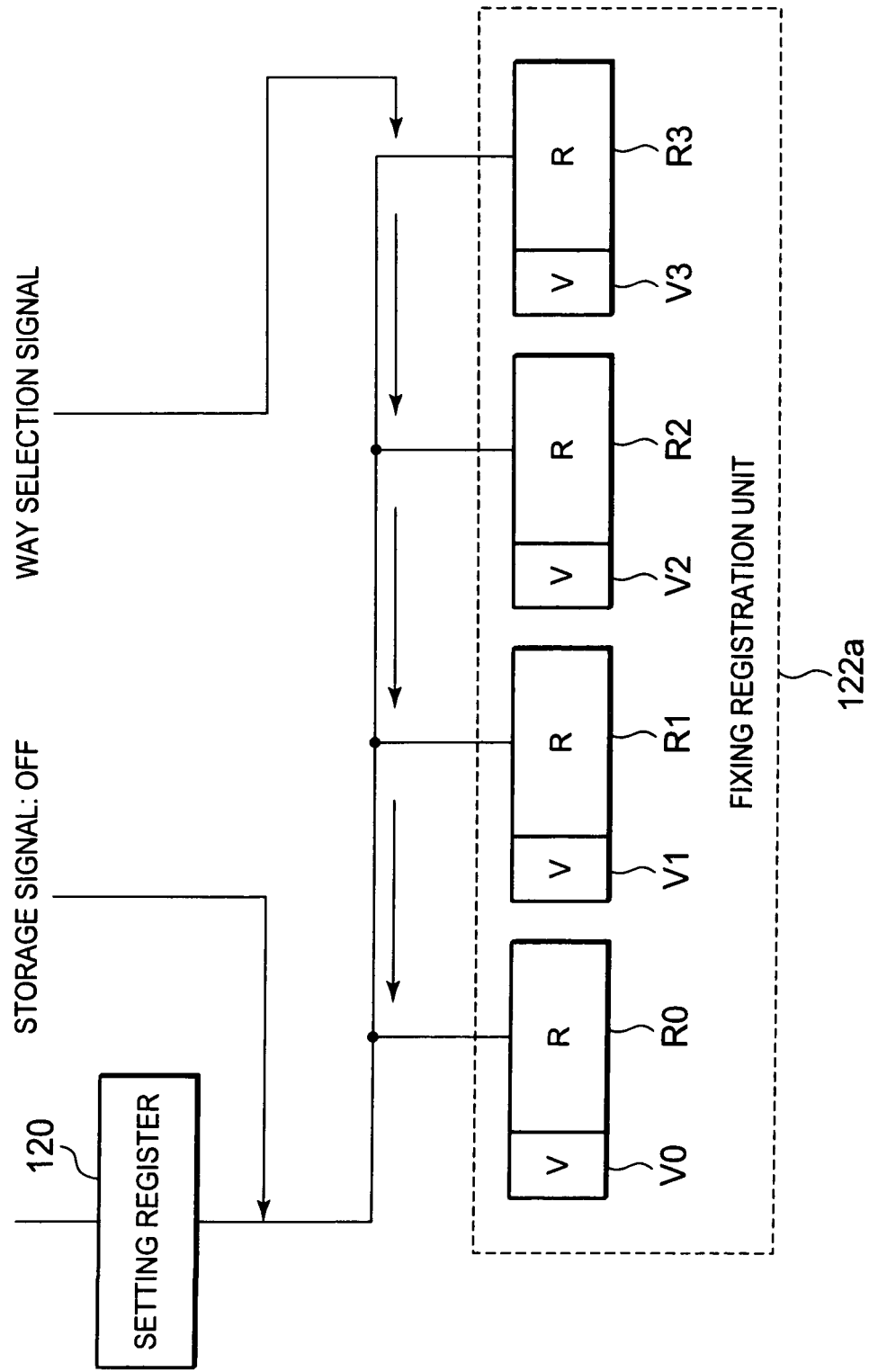
FIG. 14 is a diagram illustrating an exemplary operation of a fixing registration unit when a way is replaced.

FIG. 14 is a diagram illustrating an exemplary operation of the fixing registration unit 122a when the way is replaced. In FIG. 14, if a storage signal is OFF, then the setting register 120 transfers the data group number to the fixing registration unit 122a. The fixing registration unit 122a stores the transferred data group number in a fixing register corresponding to a replaced way based on the way selection signal outputted by the replacement logic circuit 112a. During that storage, valid data in a corresponding valid memory is rewritten from ineffective to effective.

Figure 15:
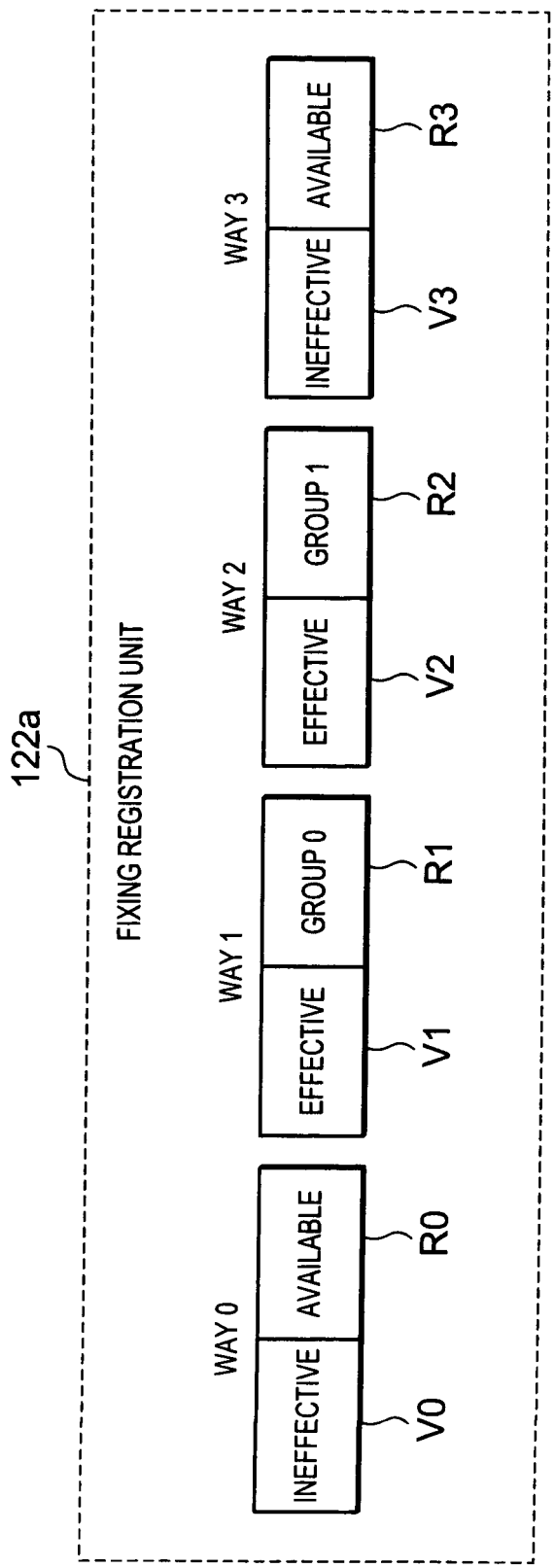
FIG. 15 is a diagram showing a state of the fixing registration unit after an exemplary sequence of instructions is executed.

FIG. 15 is a diagram showing an exemplary state of the fixing registration unit 122a after the sequences of instructions shown in FIG. 3 are executed. Assume that before the first instruction 101 shown in FIG. 3 is executed, no data has been cached, all the fixing registers R0 to R3 are available, and the replacement algorithm unit 128a has set the way 1, the way 2, the way 3 and the way 0 in descending order of replacement based on the predetermined algorithm, for example the LRU algorithm.

When the first instruction 101 belonging to the data group 0 is executed, the data group 0 has not been stored in any of the fixing registers R0 to R3, so that the replacement algorithm unit 128a selects and replaces the way 1. At the same time, the fixing register R1 stores the data group number corresponding to the data group 0, and valid data in the valid memory V1 becomes effective.

When the next instruction 102 belonging to the data group 0 is executed, the data group 0 has already been stored in the fixing register R1. Then, the matching signals C0 to C3 select the way1 and the way1 is replaced. At this time, the data group number corresponding to the instruction 102 is not stored in the fixing register R1, since the same data group number has already been stored in the fixing register R1.

When the next instruction 103 belonging to the data group 1 is executed, the data group number corresponding to the data group 1 has not been stored in any of the fixing registers R0 to R3. Then, the replacement algorithm unit 128a, for example, selects and replaces the way 2 based on the predetermined replacement algorithm. At the same time, the fixing register R2 stores the data group number 1, and valid data in the valid memory V2 becomes effective.

When the next instruction 104 belonging to the data group 1 is executed, the data group 1 has already been stored in the fixing register R2. Then, the matching signals C0 to C3 select the way 2 and the way 2 is replaced. At this time, the data group number corresponding to the instruction 104 is not stored in the fixing register R2, since the same data group number has already been stored in the fixing register R2.

Figure 16:
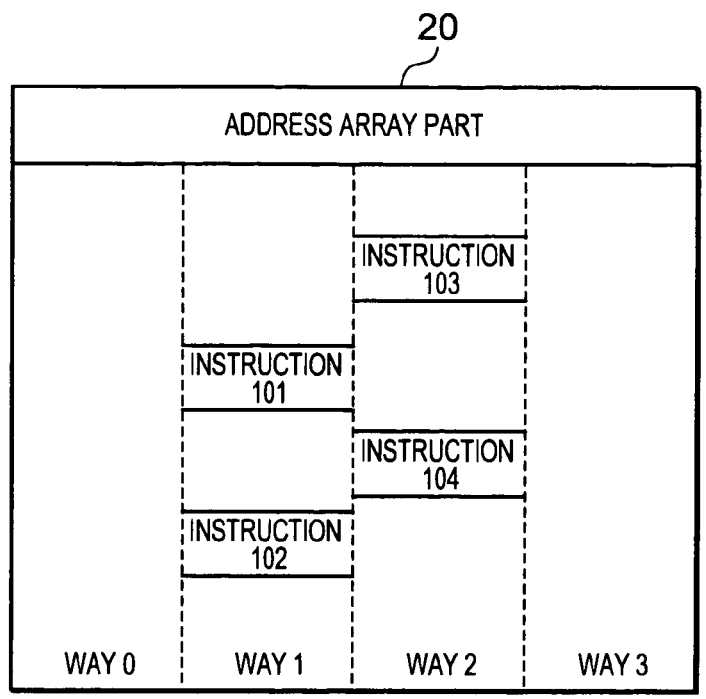
FIG. 16 is a diagram showing a state of an address array part after an exemplary sequence of instructions is executed.

FIG. 16 is a diagram showing an exemplary state of the address array part 20 after the sequence of instructions shown in FIG. 3, as described in relation to FIG. 15, are executed. As shown, addresses of data transferred by the instructions 101 and 102 indicating the same data group number 0 are recorded in the way 1. Addresses of data transferred by the instructions 103 and 104 indicating the same data group number 1 are recorded in the way 2. Similarly in the data array part 21, data transferred by the instructions 101 and 102 indicating the same data group number 0 is recorded in the way 1, while data transferred by the instructions 103 and 104 indicating the same data group number 1 is recorded in the way 2.

Figure 17:
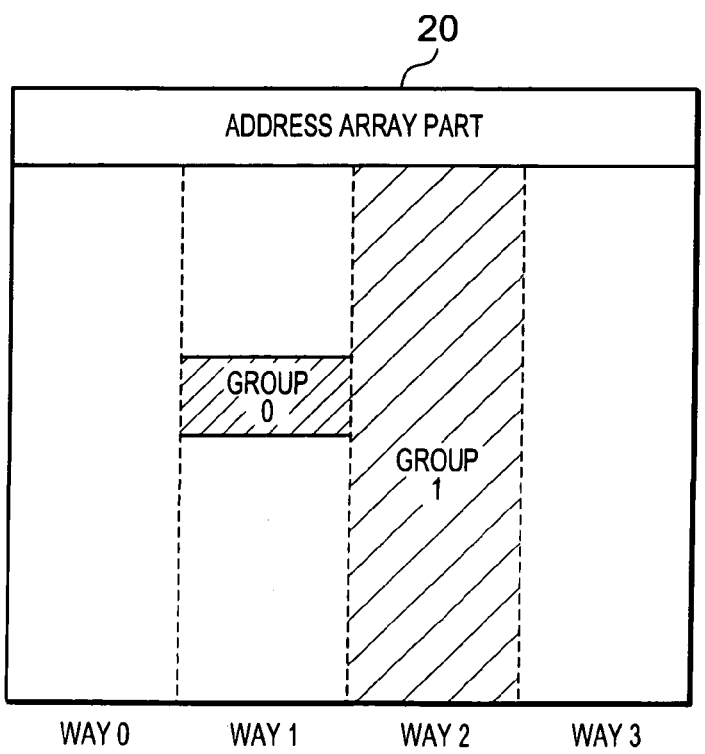
FIG. 17 is a diagram showing a state of the address array part after following instructions are further executed.

FIG. 17 is a diagram showing an exemplary state of the address array part 20 after following instructions are further executed. In FIG. 17, data in a data group 1 constitutes a large data set and has low reusability, while data in a data group 0 constitutes a small data set and has high reusability. As shown, the large data set consisting of the data group 1 is replaced in the way 2 as similarly occupying the way 2. On the other hand, an address of highly reusable data belonging to the data group 0 is not replaced with the large data set consisting of the data group 1, but is still cached in the way 1. The data array part 21 is also in a similar state.

Figure 18:
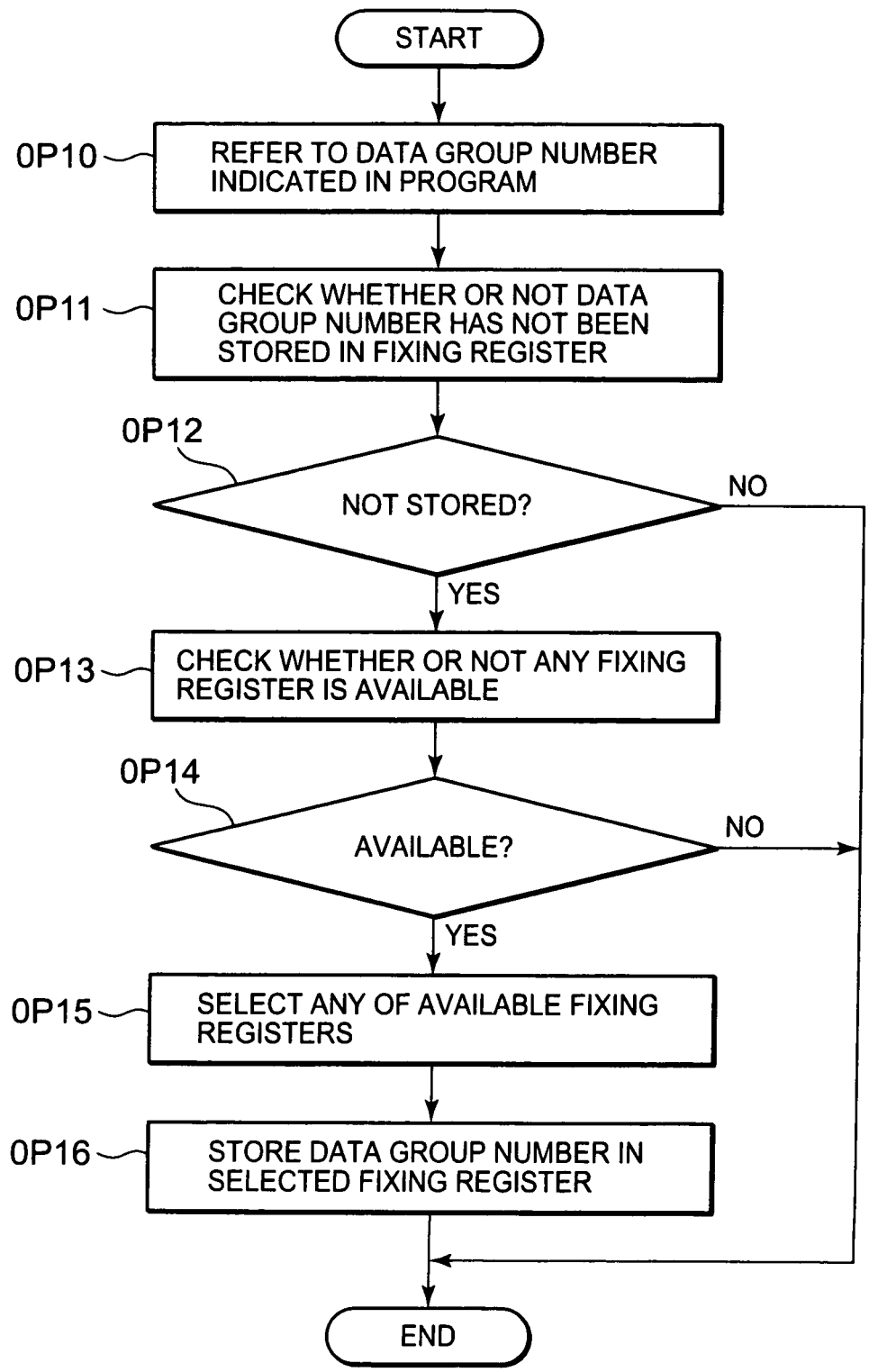
FIG. 18 is a flow diagram illustrating an exemplary operation of a way selection.
Figure 19:
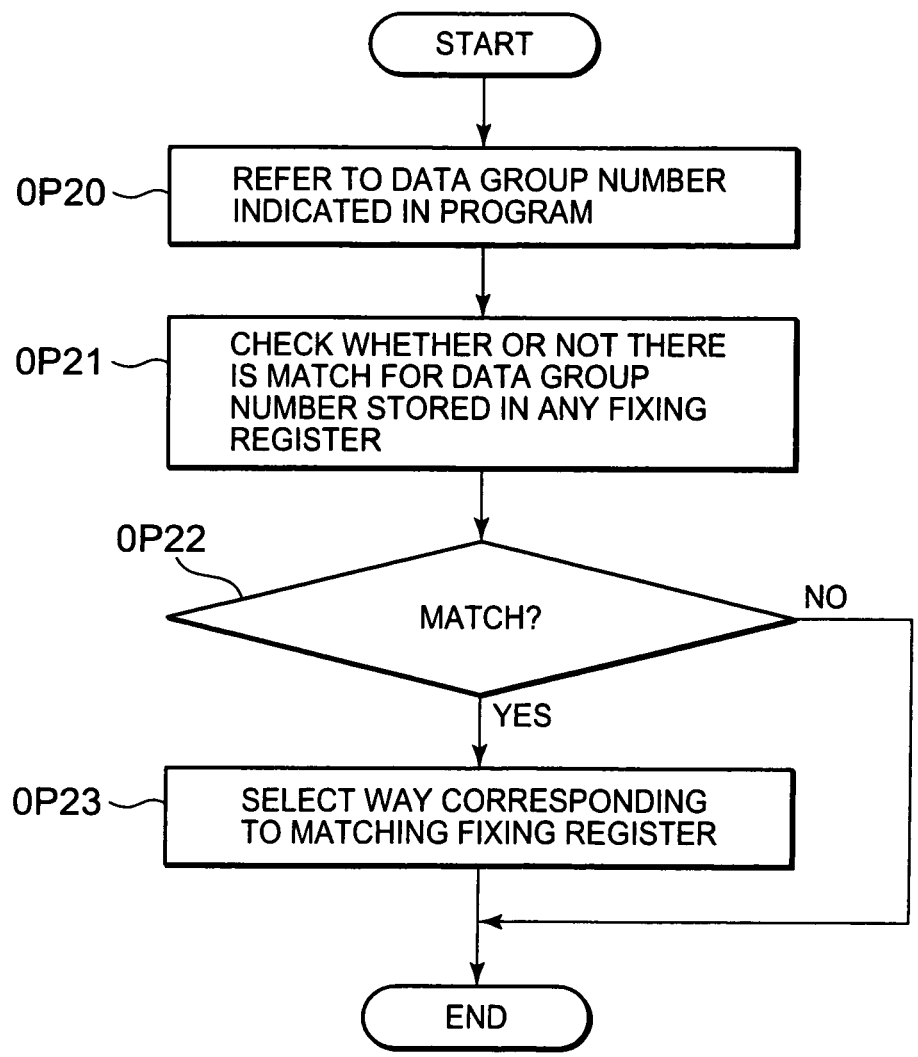
FIG. 19 is a flow diagram illustrating an exemplary operation of the way selection.

FIGS. 18 and 19 are flow diagrams illustrating exemplary way selection methods used by the replacement logic circuit 112. FIG. 18 describes an exemplary operation to store the data group number if the data group number is indicated, and there is a cache miss in the cache memory 110 when the processor core 109 executes the load instruction or the store instruction.

First in FIG. 18, the load instruction or the store instruction including the data group number is executed, and then the data group number indicated in a program is referred to (OP10). Then it is checked whether or not the data group number is the data group number that has not been stored in the fixing register yet (OP11). If the number has been already stored (OP12: NO), then the data group number is not stored.

If the number has not been stored (OP12: YES), then it is checked whether or not any fixing register is available (OP13). If no register is available (OP14: NO), then the data group number is not stored. If any register is available (OP14: YES), then any of available fixing registers is selected (OP15). Then, a way corresponding to the selected fixing register is selected as a way to be replaced, and the selected fixing register stores the data group number (OP16).

FIG. 19 illustrates an exemplary operation to select the way if the data group number is indicated and there is a cache miss in the cache memory 110 when the processor core 109 executes the load instruction or the store instruction. With storage as shown in FIG. 18, the way selection is possible shown in FIG. 19.

First in FIG. 19, the load instruction or the store instruction including the data group number is executed, and then the data group number indicated in a program is referred to (OP20). It is checked whether or not the data group number matches data group numbers stored in any fixing register (OP21). If there is no match (OP22: NO), then the way selection is committed to other replacement algorithms. If there is a match (OP22: YES), then a way corresponding to a matching fixing register is selected (OP23).

2. Second Exemplary Embodiment

According to the first exemplary embodiment, the example based on the four-way set associative has been described. According to a second exemplary embodiment, a plurality of data group numbers may be registered in each way for a request to increase the number of groups.

Figure 20:
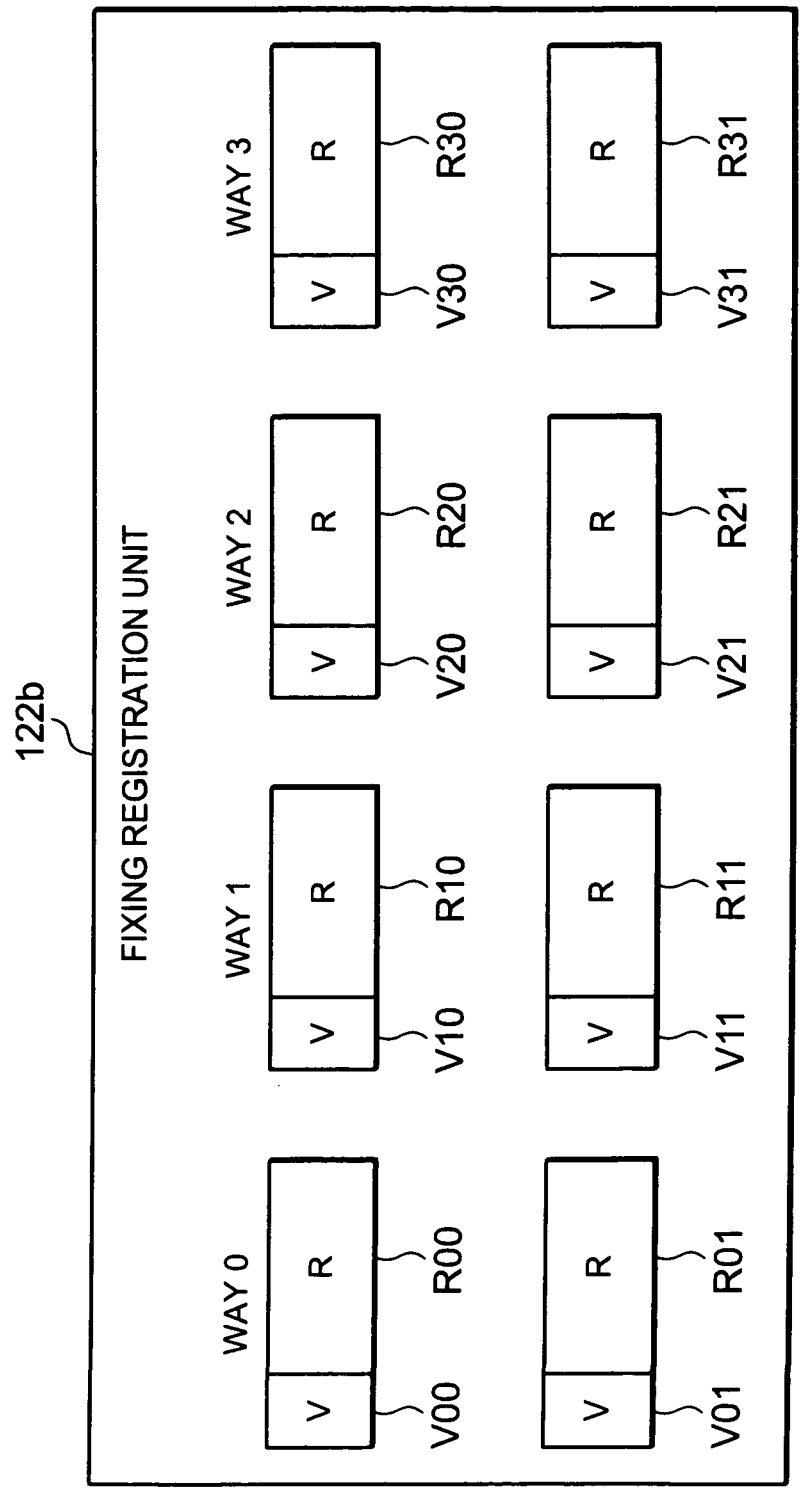
FIG. 20 is a block diagram showing an exemplary configuration of the fixing registration unit.
Figure 21:
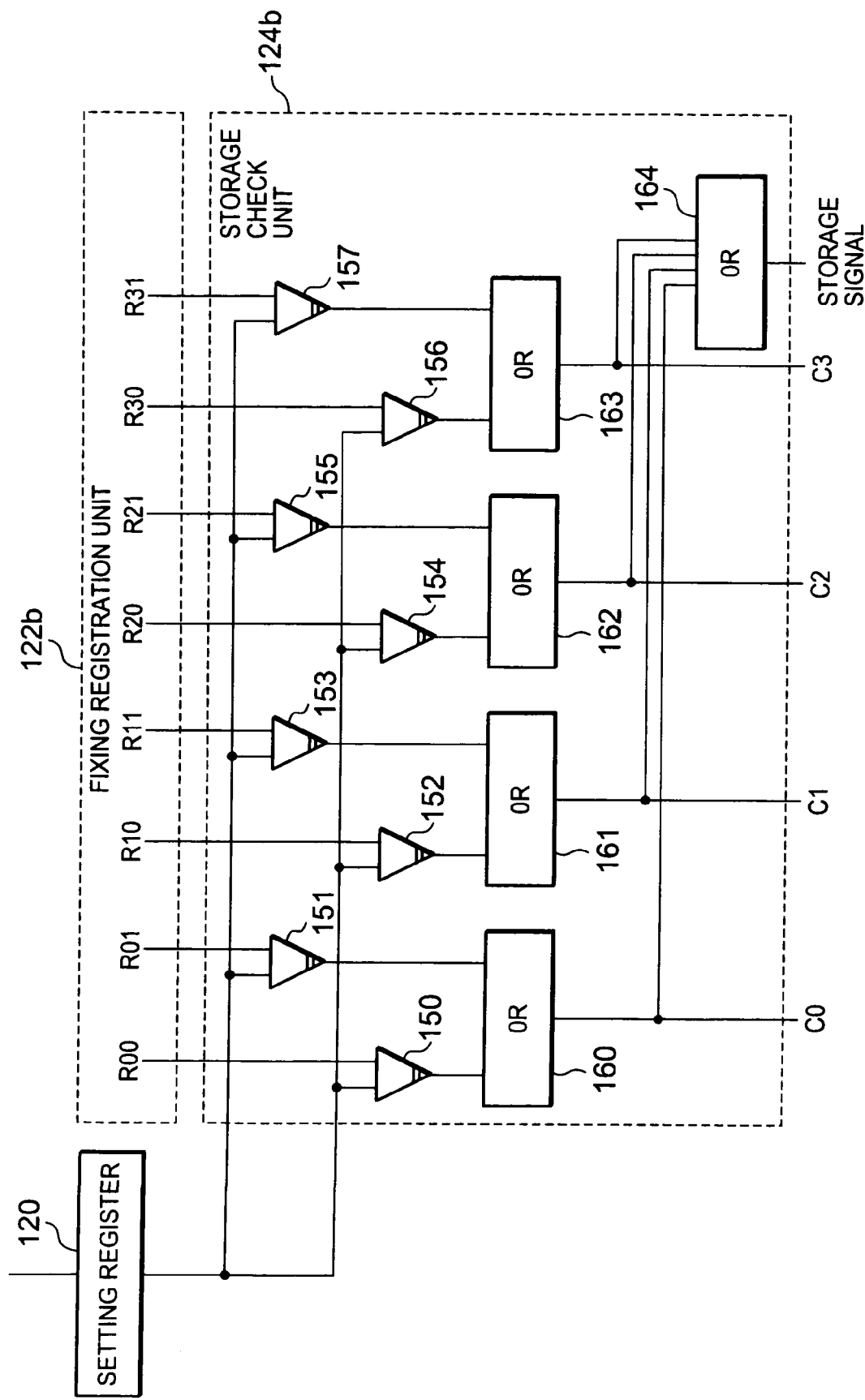
FIG. 21 is a block diagram showing an exemplary configuration of the storage check unit.
Figure 22:
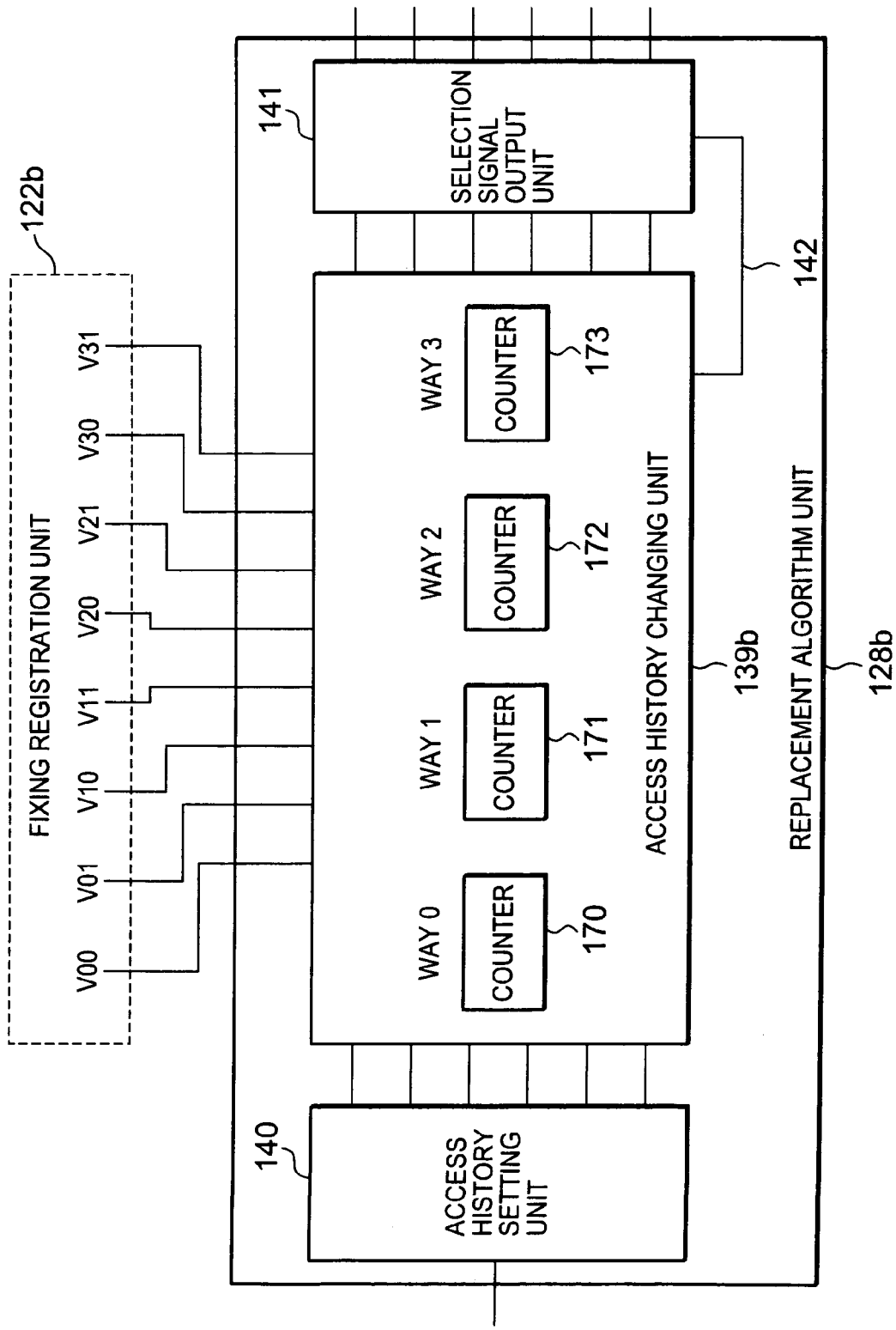
FIG. 22 is a block diagram showing an exemplary configuration of the replacement algorithm unit.

With reference to FIGS. 20 to 22, an example will be described in detail in that two data group numbers may be registered in each way, for example. According to the second exemplary embodiment, the fixing registration unit 122, the storage check unit 124 and the replacement algorithm unit 128 in the replacement logic circuit 112 shown in FIG. 8 replace those in the first exemplary embodiment.

FIG. 20 is a block diagram showing an exemplary configuration of a fixing registration unit 122*b*. In FIG. 20, a fixing registration unit 122*b* includes eight fixing registers R00, R01, R10, R11, R20, R21, R30 and R31. The fixing registers R00, R01, R10, R11, R20, R21, R30 and R31 may store data group numbers. Valid memories V00, V01, V10, V11, V20, V21, V30 and V31 retain valid data indicating whether or not the corresponding fixing registers R00, R01, R10, R11, R20, R21, R30 and R31 store data group numbers.

The fixing registers R00 and R01 and the valid memories V00 and V01 are associated with the way 0 of the cache memory, for example. The fixing registers R10 and R11 and the valid memories V10 and V11 are associated with the way 1 of the cache memory, for example. The fixing registers R20 and R21 and the valid memories V20 and V21 are associated with the way 2 of the cache memory, for example. The fixing registers R30 and R31 and the valid memories V30 and V31 are associated with the way 3 of the cache memory, for example.

FIG. 21 is a block diagram showing an exemplary configuration of a storage check unit 124*b*. In FIG. 21, a storage check unit 124*b* includes comparators 150 to 157 and OR circuits 160 to 164. The comparator 150 compares the data group number stored in the setting register 120 and the data group number stored in the fixing register R00. If they match each other, then the comparator 150 outputs an "ON" signal. The comparator 151 compares the data group number retained in the setting register 120 and the data group number stored in the fixing register R01. If they match each other, then the comparator 151 outputs an "ON" signals. The OR circuit 160 outputs an ON matching signal C0 when output from either of the two comparators 150 and 151 corresponding to the way 0 is "ON", and outputs an OFF matching signal C0 when outputs from both of the two comparators 150 and 151 are "OFF".

The comparator 152 compares the data group number retained in the setting register 120 and the data group number stored in the fixing register R10. If they match each other, then the comparator 152 outputs an "ON" signal. The comparator 153 compares the data group number retained in the setting register 120 and the data group number stored in the fixing register R11. If they match each other, then the comparator 153 outputs an "ON" signal. The OR circuit 161 outputs an ON matching signal C1 when output from either of the two comparators 152 and 153 corresponding to the way 1 is "ON", and outputs an OFF matching signal C1 when outputs from both of the two comparators 152 and 153 are "OFF".

The comparator 154 compares the data group number retained in the setting register 120 and the data group number stored in the fixing register R20. If they match each other, then the comparator 154 outputs an "ON" signal. The comparator 155 compares the data group number retained in the setting register 120 and the data group number stored in the fixing register R21. If they match each other, then the comparator 155 outputs an "ON" signal. The OR circuit 162 outputs an ON matching signal C2 when output from either of the two comparators 154 and 155 corresponding to the way 2 is "ON", and outputs an OFF matching signal C2 when outputs from both of the two comparators 154 and 155 are "OFF".

The comparator 156 compares the data group number retained in the setting register 120 and the data group number stored in the fixing register R30. If they match each other, then the comparator 156 outputs an "ON" signal. The comparator 157 compares the data group number retained in the setting register 120 and the data group number stored in the fixing register R31. If they match each other, then the comparator 157 outputs an "ON" signal. The OR circuit 163 outputs an ON matching signal C3 when the output from either of the two comparators 156 and 157 corresponding to the way 3 is "ON", and outputs an OFF matching signal C3 when output from both the two comparators 156 and 157 is "OFF".

The OR circuit 164 outputs an ON storage signal when at least one of the matching signals C0 to C3 is "ON", and outputs an OFF storage signal when all the matching signals C0 to C3 are "OFF".

FIG. 22 is a block diagram showing an exemplary configuration of a replacement algorithm unit 128b. The replacement algorithm unit 128b in FIG. 22 may be configured such that the access history changing unit 135a in the replacement algorithm unit 128a shown in FIG. 13 is replaced with an access history changing unit 139b. In FIG. 22, the replacement algorithm unit 128b includes the access history setting unit 140, the access history changing unit 139b, the selection signal output unit 141 and the control line 142.

In FIG. 22, the access history changing unit 139b refers to valid data in the valid memories V00, V01, V10, V11, V20, V21, V30 and V31, and mandatorily reverses a signal outputted from the access history setting unit 140 depending on contents of the memories. The access history changing unit 139b in FIG. 22 includes four counters 170 to 173 corresponding to respective four ways 0 to 3.

The counter 170 refers to valid data in the two valid memories V00 and V01 corresponding to the way 0, and counts the number of valid data being ineffective in the two fixing registers R00 and R01 corresponding to the way 0. The counter 171 refers to valid data in the two valid memories V10 and V11 corresponding to the way 1, and counts the number of valid data being ineffective in the two fixing registers R10 and R11 corresponding to the way 1.

The counter 172 refers to valid data in the two valid memories V20 and V21 corresponding to the way 2, and counts the number of valid data being ineffective in the two fixing registers R20 and R21 corresponding to the way 2. The counter 173 refers to valid data in the two valid memories V30 and V31 corresponding to the way 3, and counts the number of valid data being ineffective in the two fixing registers R30 and R31 corresponding to the way 3.

The access history changing unit 139b changes the access history so that a way corresponding to a counter indicating the largest value indicates the highest replacement order. If a plurality of counters indicate the largest value, then the unit 139b changes the access history so that the least recently accessed way among ways corresponding to the counters, which indicate the largest value, indicates the highest replacement order. However, if results of counting by all the counters 170 to 173 are zero, then the unit 139b outputs a no-selection signal, to notify that no way is to be selected, to the selection signal output unit 141 via the control line 142. In response, the selection signal output unit 141 mandatorily outputs "0000", for example, not to select any of the four ways.

3. Third Exemplary Embodiment

Figure 23:
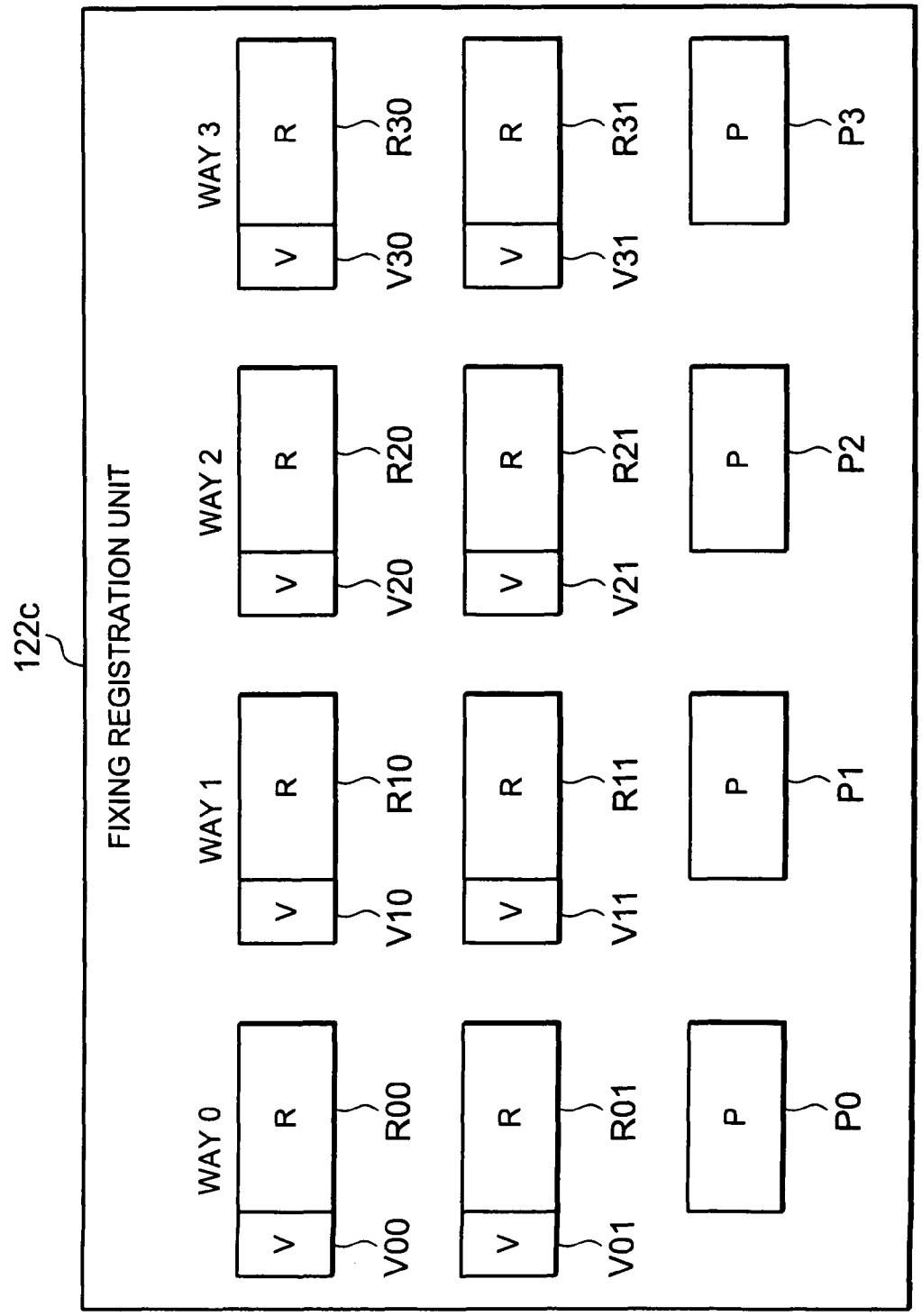
FIG. 23 is a block diagram showing an exemplary configuration of the fixing registration unit.

A third exemplary embodiment is an example in that the fixing registration unit 122b in the second exemplary embodiment is replaced with a fixing registration unit 122c shown in FIG. 23. According to the third exemplary embodiment, for example, only two ways of four ways are set as ways that may be only for data belonging to the data groups. In other words, the number of the ways fixable for storing the data belonging to the data group may be adjustable in the third exemplary embodiment.

FIG. 23 is a block diagram showing an exemplary configuration of the fixing registration unit 122C. In FIG. 23, the fixing registration unit 122c includes eight fixing registers R00, R01, R10, R11, R20, R21, R30 and R31. The fixing registration unit 122c further includes four inhibited memories P0 to P3 corresponding to the respective four ways. The four inhibited memories P0 to P3 retain inhibited data.

When inhibited data in the inhibited memory P0 indicates inhibition, the fixing registers R00 and R01 corresponding to the way 0 are inhibited from being used. Then, the way 0 is not exclusively used for data belonging to any data group. When inhibited data in the inhibited memory P1 indicates inhibition, the fixing registers R10 and R11 corresponding to the way 1 are inhibited from being used. Then, the way 1 is not exclusively used for data belonging to any data group. When inhibited data in the inhibited memory P2 indicates inhibition, the fixing registers R20 and R21 corresponding to the way 2 are inhibited from being used. When inhibited data in the inhibited memory P3 indicates inhibition, the fixing registers R30 and R31 corresponding to the way 3 are inhibited from being used. A program may control the inhibited memories P0 to P3 such as by further changing the instruction specifications of the load instruction and the store instruction.

The description has been made assuming that the processor accesses the main storage device in relation to the first to third exemplary embodiments. However, the present invention may be also applied to a case that the processor accesses external memories other than the main storage device. For example, the present invention may be applied to a case that data is read from and data is written into an auxiliary storage device. The description is based on the example of the load instruction and the store instruction as instructions for the processor to access the external memory. However, in the present invention, an external memory access instruction other than the load instruction and the store instruction may also indicate the data group number.

Furthermore, although the replacement logic circuit 112 is typically formed in hardware, it may be also operated by a program.

Further, it is noted that applicant's intent is to encompass equivalents of all claim elements, even if amended later during prosecution.

What is claimed is:

1. An apparatus, comprising:
   a processor which issues a plurality of commands including a data address and a first identifier of a plurality of identifiers individually,
      wherein said plurality of identifiers is assigned to an identical command for classifying each of said commands; and
   a cache memory which includes a plurality of ways to store a data corresponding to said command,
   wherein said cache memory comprises:
      a register to store a second identifier of the plurality of identifiers, said register corresponding to at least one of said ways being fixed, said fixed way exclusively stores said data corresponding to said command which includes said first identifier which is a same as said second identifier stored in said register, during which said register stores said second identifier; and
      a replacement controller which selects a replacement way based on a predetermined replacement algorithm in a case of a cache miss, and excludes said fixed way from a candidate of said replacement way when said register corresponding to said fixed way stores said second identifier, and
   wherein said fixed way is selected to exclusively store said data corresponding to said command based on a match between said first identifier and said second identifier.

2. The apparatus according to claim 1, further comprising:
   a switching unit which switches said replacement way to said fixed way when said second identifier stored in said register matches with said first identifier included in said command.

3. The apparatus according to claim 2, wherein said cache memory further comprises:
   a checking unit which checks whether said first identifier included in said command and said second identifier stored in said register match, and notifies a result of checking to said switching unit, wherein said switching unit switches said replacement way to said fixed way, when said result indicates that said first identifier included in said command and said second identifier stored in said register match.

4. The apparatus according to claim 1, wherein said register comprises one of the plurality of said registers, and wherein each of said registers corresponds to at least one of said ways being fixed.

5. The apparatus according to claim 1, wherein said replacement controller selects said replacement way corresponding to a way being accessed least recently, wherein said replacement controller comprises:
an access history alteration unit which alters an access history of said fixed way so that said access history of said fixed way indicates that said fixed way is accessed most recently when said register, corresponding to said fixed way, stores said second identifier.

6. The apparatus according to claim 1, wherein said register comprises a plurality of said registers, wherein said registers comprise one of the plurality of data group identifiers, wherein said fixed way comprises a plurality of fixed ways, and wherein each of said data group identifiers corresponds to each of said fixed ways.

7. The apparatus according to claim 6, wherein said replacement controller selects said replacement way corresponding to a way being accessed least recently, wherein said replacement controller further comprises:
an access history alteration unit which alters an access history of said fixed way so that said access history of said fixed way indicates that said fixed way is accessed most recently, wherein said access history alteration unit comprises:
a plurality of counters each of which corresponds to each of said data group identifiers, and counts a number of registers not storing said second identifier within each of said data group identifiers, and wherein said access history alteration unit alters said access history of at least one of said fixed ways, which corresponds to said counter counting a highest number, so that said access history of at least one of said fixed ways indicates that said fixed way is accessed most recently.

8. The apparatus according to claim 1, wherein said register comprises one of the plurality of said registers, wherein each of said registers corresponds to at least one of said ways being fixed, and wherein at least one of said registers comprises a capability of preventing storing of said second identifier.

9. A processor, comprising:
a cache memory which includes a plurality of ways to store a data corresponding to a command, wherein said processor issues a plurality of commands including a data address and a first identifier of a plurality of identifiers individually, wherein said plurality of identifiers is assigned to an identical command for classifying each of said commands, said plurality of commands including said command, wherein said cache memory comprises:
a register to store a second identifier of the plurality of identifiers, said register corresponding to at least one of said ways being fixed, said fixed way exclusively storing said data corresponding to said command which includes said first identifier which is a same as said second identifier stored in said register, during which said register stores said second identifier; and a replacement controller which selects a replacement way based on a predetermined replacement algorithm in a case of a cache miss, and excludes said fixed way from a candidate of said replacement way when said register corresponding to said fixed way stores said second identifier, and wherein said fixed way is selected to exclusively store said data corresponding to said command based on a match between said first identifier and said second identifier.

10. The processor according to claim 9, further comprising:
a switching unit which switches said replacement way to said fixed way when said second identifier stored in said register matches with said first identifier included in said command.

11. The processor according to claim 10, wherein said cache memory further comprises:
a checking unit which checks whether said first identifier included in said command and said second identifier stored in said register match, and notifies a result of checking to said switching unit, wherein said switching unit switches said replacement way to said fixed way, when said result indicates that said first identifier included in said command and said second identifier stored in said register match.

12. The processor according to claim 9, wherein said register comprises one of the plurality of said registers, and wherein each of said registers corresponds to at least one of said ways being fixed.

13. The processor according to claim 9, wherein said replacement controller selects said replacement way corresponding to a way being accessed least recently, and wherein said replacement controller comprises:
an access history alteration unit which alters an access history of said fixed way so that said access history of said fixed way indicates that said fixed way is accessed most recently when said register, corresponding to said fixed way, stores said second identifier.

14. The processor according to claim 9, wherein said register comprises one of the plurality of said registers, wherein said registers comprise a plurality of data group identifiers, wherein said fixed way comprises one of the plurality of fixed ways, and wherein each of said data group identifiers corresponds to each of said fixed ways.

15. The processor according to claim 14, wherein said replacement controller selects said replacement way corresponding to a way being accessed least recently, wherein said replacement controller comprises:
an access history alteration unit which alters an access history of said fixed way so that said access history of said fixed way indicates that said fixed way is accessed most recently;

wherein said access history alteration unit comprises:
a plurality of counters each of which corresponds to each of said data group identifiers, and counts a number of registers not storing said second identifier within each of said data group identifiers, and wherein said access history alteration unit alters said access history of at least one of said fixed ways, which corresponds to said counter counting a highest number, so that said access history of at least one of said fixed ways indicates that said fixed way is accessed most recently.

16. The processor according to claim 9, wherein said register comprises one of the plurality of said registers,
wherein each of said registers corresponds to at least one of said ways being fixed, and
wherein at least one of said registers comprises a capability of preventing storing of said second identifier.

17. A method of controlling a cache memory including a plurality of ways, said method comprising:
issuing a plurality of commands including a data address and a first identifier of a plurality of identifiers individually,
wherein said plurality of identifiers is assigned to an identical command for classifying each of said commands;
storing a data corresponding to the command of said plurality of commands to said cache memory;
storing a second identifier of the plurality of identifiers, said register corresponding to at least one of said ways being fixed, said fixed way exclusively storing said data corresponding to said command which includes said first identifier which is a same as said second identifier stored in said register, during which said register stores said second identifier;
selecting a replacement way based on a predetermined replacement algorithm in a case of a cache miss; and
excluding said fixed way from a candidate of said replacement way when said register corresponding to said fixed way stores said second identifier,
wherein said fixed way is selected to exclusively store said data corresponding to said command based on a match between said first identifier and said second identifier.

18. The method according to claim 17, further comprising:
switching said replacement way to said fixed way when said second identifier stored in said register matches with said first identifier included in said command.

19. The method according to claim 17, further comprising:
checking whether said first identifier included in said command and said second identifier stored in said register match;
notifying a result of checking; and
switching said replacement way to said fixed way when said result indicates that said first identifier included in said command and said second identifier stored in said register match.

20. The method according to claim 17, further comprising:
selecting a replacement way based on an LRU (Least Recently Used) algorithm in case of said cache miss;
selecting said replacement way corresponding to a way being accessed least recently; and
altering an access history of said fixed way so that said access history of said fixed way indicates that said fixed way is accessed most recently when said register corresponding to said fixed way stores said second identifier.

21. The method according to claim 17, wherein said register comprises one of the plurality of said registers,
wherein said registers comprise a plurality of data group identifiers,
wherein said fixed way comprises a plurality of fixed ways,
wherein each of said data group identifiers corresponds to each of said fixed ways, said method further comprising:
selecting a replacement way corresponding to a way being accessed least recently;
altering an access history of said fixed way so that said access history of said fixed way indicates that said fixed way is accessed most recently;
counting a number of registers not storing said second identifier within each of said data group identifiers; and
altering said access history of at least one of said fixed ways, which corresponds to said data group identifiers with a highest counted number, so that said access history of at least one of said fixed ways indicates that said fixed way is accessed most recently.

22. The method according to claim 17, wherein said register comprises one of the plurality of said registers, and
wherein each of said registers corresponds to at least one of said ways being fixed, said method further comprising:
preventing storing of said second identifier in at least one of said registers.

* * * * *